Patented Feb. 12, 1952

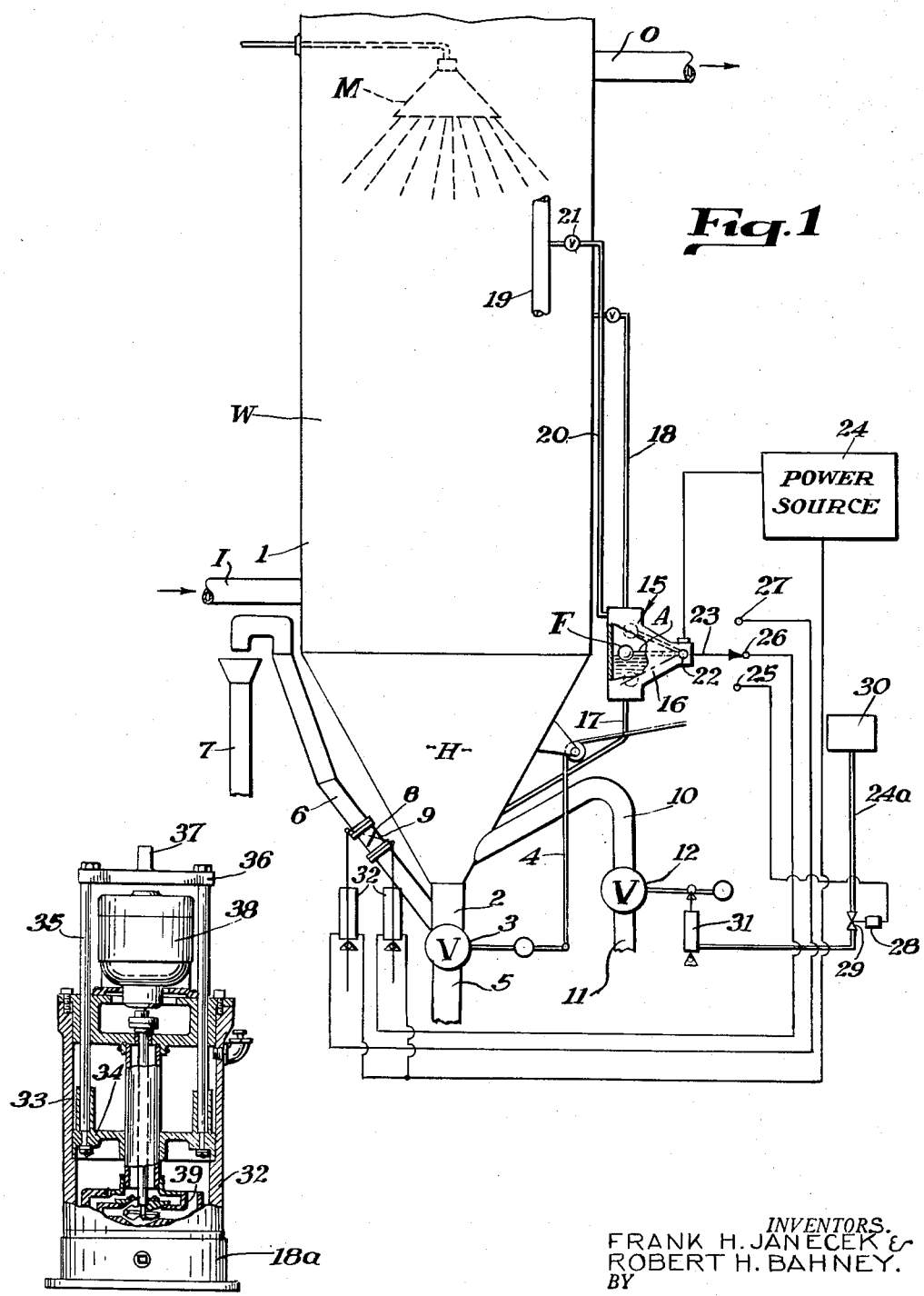

2,585,779

UNITED STATES PATENT OFFICE 2,585,779

LIQUID SEAL FOR GAS WASHERS

Frank H. Janecek, Cleveland, and Robert H. Bahney, Lakewood, Ohio, assignors to Republic Steel Corporation, Cleveland, Ohio, a corporation of New Jersey Application September 12, 1947, Serial No. 773,680

2 Claims. (Cl. 261—117)

This invention relates to the art of controlling liquid levels and is particularly concerned with a novel method and new apparatus for maintaining substantially constant the level of liquid in the bottom of the gas washer of a blast furnace.

Gases from blast furnaces are customarily led through dust catchers and then through gas washers. The usual gas washer comprises a vertical column having a water-containing-hopper at the lower end, an inlet above the level of the water for gases from the dust catcher, means to spray water into the rising stream of gas, and a conduit leading from the top of the column through which the thus washed gas may escape. It is quite important to maintain the liquid in the hopper at the bottom of the washer at a substantially constant level, for if it rises to the gas inlet it will impede the flow of gases through the washer and if it falls too far gases may escape through the hopper or air may enter and mix with the gas.

When a furnace is operating at conventional pressures of not to exceed about two or three pounds per square inch gas pressure in the furnace above the stock line, no particular difficulty is encountered in maintaining the surface of liquid in the hopper at a substantially constant level. However, when a furnace is being operated at high pressures, that is above about five pounds per square inch, the necessity for adequate control is greatly increased.

Larger volumes of gases must be handled and require larger quantities of water. Sudden increases in the volume of gas leaving the furnace as may result from "slips" or "rolls" of the charge in the furnace add to the difficulty of maintaining constant the liquid level in the hopper of the gas washer. Such sudden increases in pressure may blow enough water out of the washer to permit air to enter and mix with the gas and make a dangerous mixture. Gas may also escape from the washer to endanger personnel. But in any case, operating time is lost while the furnace is checked and water is restored to the hopper.

The present invention makes it possible to wash the larger volumes of gas at the higher pressures and to insure the constant existence of a proper seal against air ingress despite the usual slips and rolls of the furnace. These results are attained by automatically maintaining the surface level of liquid substantially constant in the washer. When the gas pressure increases the resultant increase in outflow of liquid is controlled by a valve in the overflow line which is automatically actuated by a lowering of the liquid level. When the liquid level rises it is restored to the normal level by automatically opening the valve in the emergency conduit which is also operated automatically by the surface level maintaining means.

The present invention and the manner of and means for practicing it in a preferred form will be better understood by those skilled in the art by referring to the following detailed description and the drawings accompanying and forming a part of this specification, in which Figu 1 is a diagrammatic sketch of a control sys*em of a preferred form of this invention ap; ied to a conventic.al blast furnace gas washer, and Figure 2 is a view partly in section of a thruster for operating a valve in said control system.

In general, the present apparatus comprises a blast furnace washer W, an overflow conduit, an emergency outlet conduit, and float control means for maintaining the surface level of water in the washer substantially constact.

The washer W is of conventional form, consisting of a cylinder 1 having an inlet I near its bottom for dirty gas to be washed, an outlet O near its top for escape of the clean gas, means M for discharging water in spray form down onto the ascending gas, and a hopper H at the bottom of cylinder 1 substantially filled with water. The hopper H has a discharge conduit 2 which is open at its lower end, and has a valve 3 to close the opening. This valve is actuated manually by cable 4 and liquid and solids discharged from conduit 2 empty into a sewer connection 5.

An overflow conduit 6 extends upwardly from conduit 2 to the predetermined surface level of liquid in the washer, and discharges into a sewer connection 7. A valve 8 in conduit 6 has a lever 9 attached thereto by means of which the valve may be actuated by apparatus presently to be described.

An emergency outlet conduit 10 is inclined upwardly from hopper H at a point above conduit 2 and then is bent downwardly to discharge into a sewer connection 11. The lower outlet end of emergency conduit 10 is controlled by valve 12.

A float switch, generally designated by the numeral 15, is positioned alongside of washer W on the predetermined surface level of water in the washer. This switch includes a housing 16 which communicates through pipe line 17 with hopper H above the intake end of conduit 10, and communicates through pipe line 18 with cylinder 1 well above the normal surface level of liquid in the washer. A pipe line 19 which serves to bring make-up water into the washer is connected through line 20 to housing 16, and flow of liquid through line 20 is controlled by valve 21.

Within housing 15 a float F is carried at the end of an arm A which is secured to a shaft 22 rotatably mounted in the housing. The housing is positioned relative to the washer so that when the surface of water in the washer is at the predetermined level the float arm A is substantially horizontal. Shaft 22 has fastened thereto an arm 23, the right hand end of which serves to connect a source of electrical power 24 with any one of the three terminals 25, 26 and 27.

Terminal 25 is part of an electrical circuit which includes a solenoid 28. This solenoid controls a valve 29 which in turn controls the flow of fluid under pressure from source 30 to a cylinder 31 which serves to actuate valve 12 of the emergency outlet conduit 10.

Terminals 26 and 27 are connected respectively to motors of thrusters 32 which in turn are connected respectively to the opposite ends of lever 9 which controls valve 8 of conduit 6.

One of the thrusters 32 is shown in Fig. 2 with parts in section and other parts omitted. Briefly described, this thruster comprises a cylinder 33 having a piston 34 therein, and thruster rods 35 leading from the piston through the upper end of the cylinder to a cross bar 36 which has a lug 37 to be attached by a rod to the end of lever 9. A motor 38 is mounted on the top of cylinder 33 and its rotor shaft projects through piston 34 and carries a liquid impeller 39 at the lower end thereof. When the motor is actuated, impeller 39 pumps liquid from the bottom of the cylinder up against the piston 34 and pushes the piston up in the cylinder and thus raises cross bar 36. When the motor 38 is de-energized, the fluid runs back into the bottom of the cylinder and gravity returns piston 34 to its normal position.

The operation of the above described apparatus is substantially as follows: The valves 3 and 12 are closed and valve 8 is adjusted so that the normal rate of flow of water out through conduit 6 is approximately the same as the rate of water flow into the water. Under these conditions, the surface level of water in the washer will be substantially on a line with the switch arm 23 in Fig. 1. Since the quantity of solids in the hopper H vary and tend to cause variations in the outflow of water through conduit 6, fluctuations in the surface level of the water in the washer frequently occur. When such variations occur and while they are small in magnitude, switch arm 23 will make and break contact with terminal 26 at short intervals. When the arm makes contact it energizes the thruster connected in circuit therewith and the thruster opens valve 8 to a slightly greater extent, thereby permitting water to flow out at a faster rate and the water level in the washer to drop. As the level drops, float F falls with it and arm 23 breaks contact with terminal 26. Thereupon the piston in the thruster tends to return to its former position and shifts valve 8 accordingly. This make-and-break action continues except for abnormal operating conditions which may cause the surface level of the liquid to rise or fall to predetermined limits.

When the washer is being used with a blast furnace operating at pressures higher than conventional pressures, for example at 5 pounds p. s. i. or more, and slips or rolls of the charge in the furnace occurs, the volume of gas discharged into the washer may suddenly increase and apply a corresponding increase in pressure on the surface of water in the hopper. Under such a condition the emergency conduit valve 12 remains closed and the increase in gas pressure in washer W results in an increase in the amount and rate of water flow through conduit 6. Valve 3 remains closed and as the increased flow through conduit 6 continues and the water level in the washer falls further, arm 23 engages terminal 27, actuating thruster 32 and thus substantially closing valve 8. On the other hand, when the water level rises in the washer to the maximum predetermined level, as by partial clogging of the hopper outlets, or for any other reason, switch arm 23 makes contact with terminal 25, whereupon solenoid 28 is energized with consequent opening of valve 29 and resultant admission of fluid pressure against the piston in cylinder 31 and consequent opening of the emergency conduit valve 12.

It will be understood that other suitable devices, for instance air or hydraulic cylinders, may be substituted for the thrusters shown and that any surface level sensitive device which is equivalent to the float switch device may be substituted for device 15.

Having thus described the present invention so that those skilled in the art may practice the same, we state that what we desire to secure by Letters Patent is defined in what is claimed.

What is claimed is:

1. In a gas washer for blast furnace gases comprising a washer and a hopper defining a chamber and including an inlet for gases under pressure near the hopper an outlet for gases remote from the hopper and means for spraying water into the gases remote from the hopper, the combination of an overflow conduit leading upwardly from the lower part of the hopper to a predetermined surface level of the liquid in the washer, a valve in said overflow conduit, an emergency outlet conduit leading from said hopper at an elevation above the intake end of said overflow conduit, a valve to control the flow of fluid through said emergency conduit, and apparatus responsive to variations in the surface level of the liquid in the washer for automatically actuating said valves, said apparatus comprising a source of power, cylinder means operatively connected to said valves, electrical means connected to said cylinder means to actuate said means and their valves and float-controlled switch means connecting said source of power with said electrical means.

2. In a gas washer for blast furnace gases comprising a washer and a hopper defining a chamber and including an inlet for gases under pressure near the hopper an outlet for gases remote from the hopper and means for spraying water into the gases remote from the hopper, the combination of an overflow conduit leading upwardly from the lower part of the hopper to a predetermined surface level of the liquid in the washer, a valve in said overflow conduit, an emergency outlet conduit leading from said hopper at an elevation above the intake end of said overflow conduit, a valve to control the flow of fluid through said emergency conduit, and apparatus responsive to variations in the surface level of the liquid in the washer for automatically actuating said valves, said apparatus comprising a source of power, valve positioning means operatively connected to said valves, electrical means connected to said valve positioning means to actuate said means and their valves, and switch means responsive to said variations in surface level of the liquid and connecting said source of power with said electrical means.

FRANK H. JANECEK.
ROBERT H. BAHNEY.

REFERENCES CITED

The following references are of record in the file of this patent:

UNITED STATES PATENTS

| Number | Name | Date |
|---|---|---|
| 278,590 | Otis | May 29, 1883 |
| 1,123,232 | Brassert et al. | Jan. 5, 1915 |
| 1,169,764 | Brassert | Feb. 1, 1916 |
| 1,172,930 | Brassert et al. | Feb. 22, 1916 |
| 1,269,134 | Trumble | June 11, 1918 |
| 1,543,942 | Mathesius | June 30, 1925 |
| 1,664,483 | Piron | Apr. 3, 1928 |
| 1,754,607 | Campbell | Apr. 15, 1930 |
| 1,951,497 | Wallis | Mar. 20, 1934 |
| 2,055,764 | Hanson | Sept. 29, 1936 |
| 2,107,955 | Nutter et al. | Feb. 8, 1938 |
| 2,290,065 | Natho | July 14, 1942 |